(12) United States Patent
Kelso et al.

(10) Patent No.: US 10,721,639 B2
(45) Date of Patent: Jul. 21, 2020

(54) ASCERTAINING A REGION OF INTEREST IN A WIRELESS NETWORK

(71) Applicant: Lenovo (Singapore) Pte. Ltd., Singapore (SG)

(72) Inventors: Scott Edwards Kelso, Cary, NC (US); James Anthony Hunt, Chapel Hill, NC (US); Rod D. Waltermann, Rougemont, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 93 days.

(21) Appl. No.: 15/087,402

(22) Filed: Mar. 31, 2016

(65) Prior Publication Data

US 2017/0289828 A1 Oct. 5, 2017

(51) Int. Cl.
*H04W 24/08* (2009.01)
*H04W 64/00* (2009.01)
*H04W 84/12* (2009.01)
*H04L 12/24* (2006.01)

(52) U.S. Cl.
CPC ......... *H04W 24/08* (2013.01); *H04L 41/0677* (2013.01); *H04W 64/003* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 2009/0184835 A1* | 7/2009 | Deaver, Sr. | G08B 25/06 340/660 |
| 2009/0278708 A1* | 11/2009 | Kelley | G01D 4/002 340/870.39 |
| 2011/0026500 A1* | 2/2011 | Shaffer | H04W 40/246 370/338 |
| 2011/0188452 A1* | 8/2011 | Borleske | G01D 4/004 370/328 |
| 2014/0314062 A1* | 10/2014 | Loebs | H04L 12/2803 370/338 |
| 2016/0226575 A1* | 8/2016 | Subramani | H04W 72/1226 |

* cited by examiner

*Primary Examiner* — Yee F Lam
(74) *Attorney, Agent, or Firm* — Ference & Associates LLC

(57) ABSTRACT

One embodiment provides a method, including: detecting an event; determining, using a processor of a wireless node, one or more other wireless nodes within wireless range; generating, after the event, a packet of data including identifications of the one or more wireless nodes and positional data associated therewith; and transmitting, over a network connection, the packet of data to at least one of the one or more wireless nodes. Other embodiments are described and claimed.

18 Claims, 4 Drawing Sheets

ASCERTAINING A REGION OF INTEREST IN A WIRELESS NETWORK

BACKGROUND

Internet communication, e.g., automated messages, emails, etc., is used for reporting abnormal conditions or events at a location, e.g., a home location or a business location. This type of reporting is often used in place of more traditional communication, e.g., phone communication (landline or mobile). Internet messages, e.g., delivered through a cable-modem, usually come with only municipality-level geo-location information, unless some specific measurements have been applied. In many situations, it is immensely valuable to have an estimate of the scale of an event, such as the number of houses affected by a power outage or network interruption, their relative locations, etc.

BRIEF SUMMARY

In summary, one aspect provides a method, comprising: detecting an event; determining, using a processor of a wireless node, one or more other wireless nodes within wireless range; generating, after the event, a packet of data comprising identifications of the one or more wireless nodes and positional data associated therewith; and transmitting, over a network connection, the packet of data to at least one of the one or more wireless nodes.

Another aspect provides a method, comprising: receiving, over a network connection, information comprising: identifications of a plurality of wireless nodes; positional data associated with the plurality of wireless nodes; and event data; determining, using a processor, a network map using the information, said network map comprising positions of the plurality of wireless nodes determined according to the positional data; and determining a physical position of an event associated with the event data based on the network map.

A further aspect provides an apparatus, comprising: a network communication device; one or more processors operatively coupled to the network communication device; and a memory comprising instructions executable by the one or more processors to: detect an event; determine one or more other wireless nodes within wireless range; generate, after the event, a packet of data comprising identifications of the one or more wireless nodes and positional data associated therewith; and transmit, over a network connection, the packet of data to at least one of the one or more wireless nodes.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
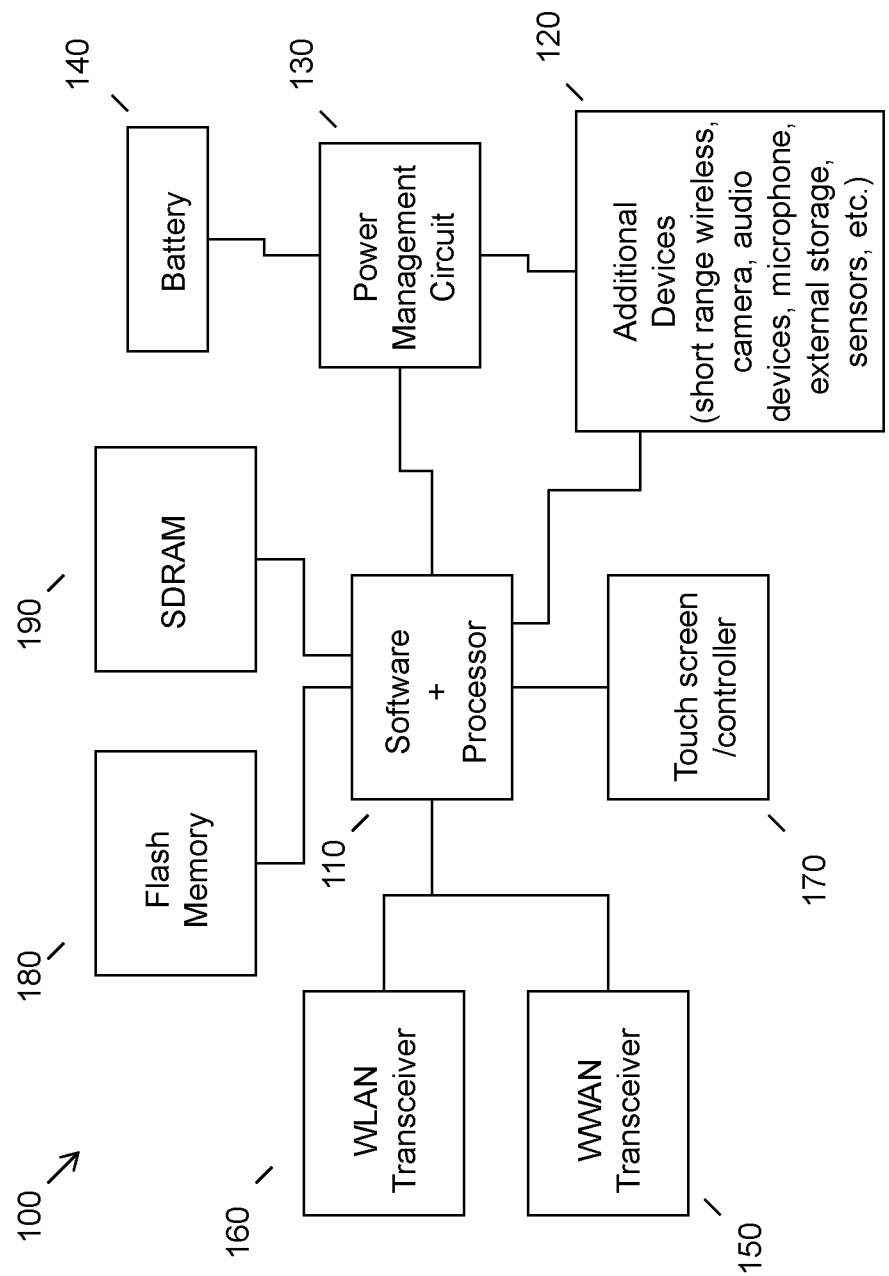
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Presently, utilities and government managers most often rely on mapping human-made reports in order to determine a location (or region) of interest that is affected by an event, e.g., a power outage, flooding, a fire, freezing conditions, etc. The manual work involved makes this difficult to scale. Alarm systems, wireless electric meters, wireless water meters, and the like might be utilized as reporting nodes and thus useful in such determinations; however, this requires large-scale deployments that many municipalities cannot afford. Some map services have location data regarding wireless transmitting devices stored in proprietary databases; however, such data is not readily available and in any case it is not a prior connected to any particular event. Thus, when an event of interest occurs, relevant parties (e.g., authorities, city managers, etc.) need to be informed about the event and have a sense of the event's scale.

An embodiment therefore leverages wireless nodes or devices, e.g., home or business WIFI Internet routers, to facilitate relative network location reporting in response to an event. Home or business routers are becoming one of the aggregation points for sensors in an Internet of Things (IoT) paradigm. As such, routers and other wireless devices may be programmed to become aware of abnormal situations such as power outages, network interruptions, flooding events, fires, and freezing conditions, etc., for example as sensed directly or via nearby devices in the home or business network that are connected to the router. It is also commonplace for such routers or wireless nodes to have a battery backup, particularly if used for VoIP services, such that these devices remain powered even during atypical conditions, e.g., a power outage.

Throughout this description, examples are given with specific reference to wireless routers; however, other wireless nodes may be utilized. Furthermore, the examples herein focus on an emergency packet of data; however, other data packet(s) may be utilized, e.g., for reporting of events that are not considered as or associated with any emergency.

In an embodiment, upon detecting a trigger event, e.g., receipt of data indicative of a reportable event of interest, a router or wireless node without an Internet connection may be programmed to begin broadcasting or transmitting a packet, e.g., an emergency packet. Other nearby routers or wireless nodes may detect the packet and route it to the Internet, if a connected is available to such routers or wireless nodes, and/or repeat the packet, i.e., to all the routers or wireless nodes within wireless range. This process may be repeated until a connection to a reporting node or the broader network (e.g., the Internet) is obtained. Once a connection to the broader network is obtained, the packet may be directed to an appropriate destination.

Each router or wireless node sending a packet includes, within the packet, a list of the other routers or wireless nodes visible to it (i.e., routers or wireless nodes within wireless range), including signal strengths. Thus, when a router or wireless node receives a packet, it examines the routers or wireless nodes reported therein and compares this list against devices within range. If there is overlap, the two sets (remote and local) may be consolidated, with regions defined by the overlap(s). If the router or wireless node detects the event in addition to receiving a packet reporting the event, the router or wireless node may join itself to a region or blob for reporting purposes. The packet or packets is/are then broadcast to other nearby routers or wireless nodes. However, a router or wireless node recognizing that it is hearing a packet (or descendent content from a packet) that it previously transmitted or originated may discard the packet so as to avoid looping broadcast storms.

An embodiment therefore permits transmission of packet(s) using home or business Internet routers and other wireless nodes that currently are not utilized for event reporting as described herein. On access to a broader network, in an embodiment the data included in the packet(s) is delivered to a service that provides information regarding the relative locations of routers or wireless nodes, including the physical location of the router(s) or wireless node(s) that detected the triggering event, and data regarding the event type. Thus, a network mapping may be provided using the data of the packet(s).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a short range wireless device for communicating with other devices. System 100 often includes a touch screen 170 for data input and display/rendering. System 100 also typically includes various memory devices, for example flash memory 180 and SDRAM 190.

Figure 2:
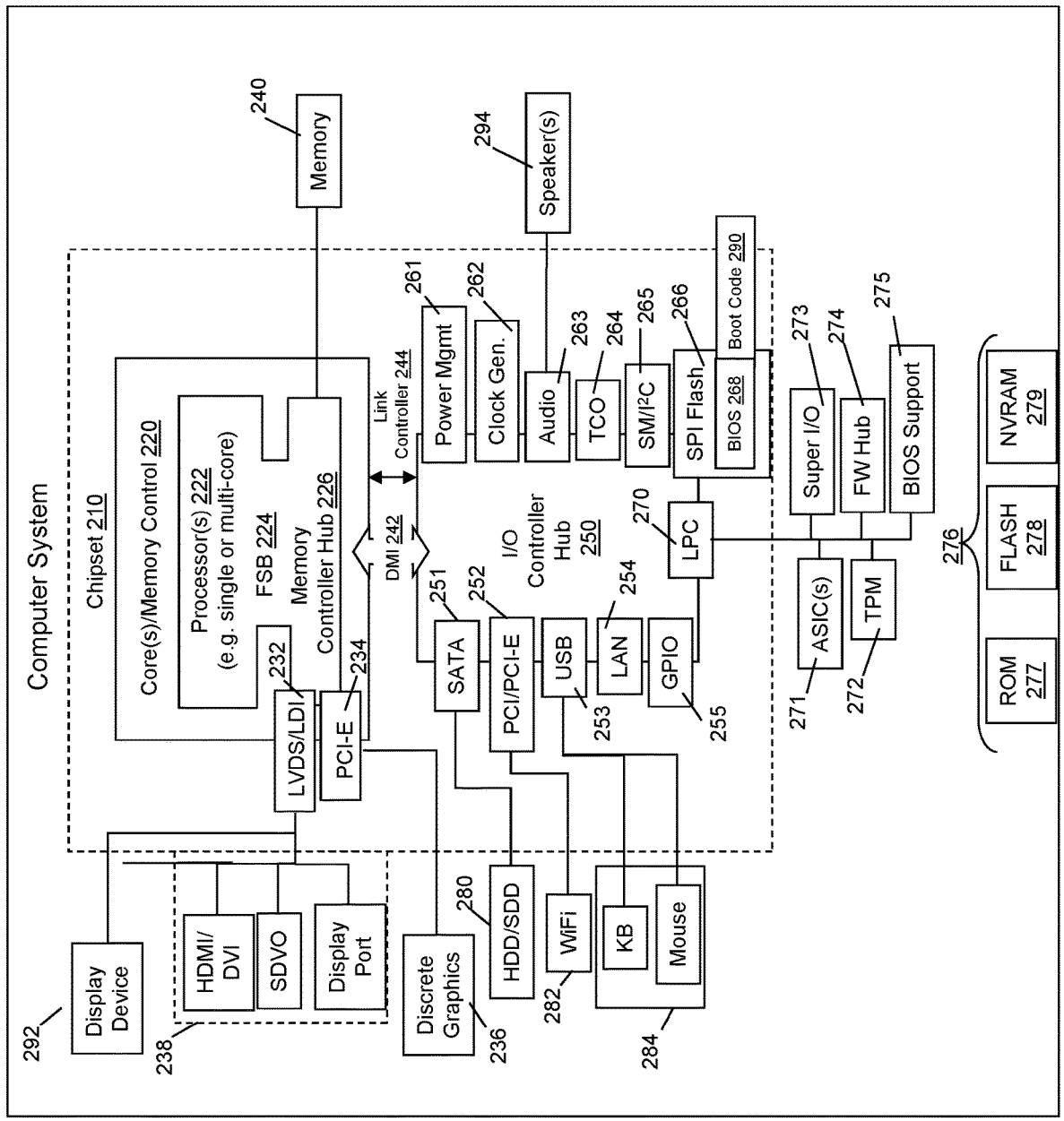
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that act as routers, e.g., a home Internet router, as well as in devices that communicate with or through a router, e.g., a home appliance or other home device included in a home or business network.

Figure 3:
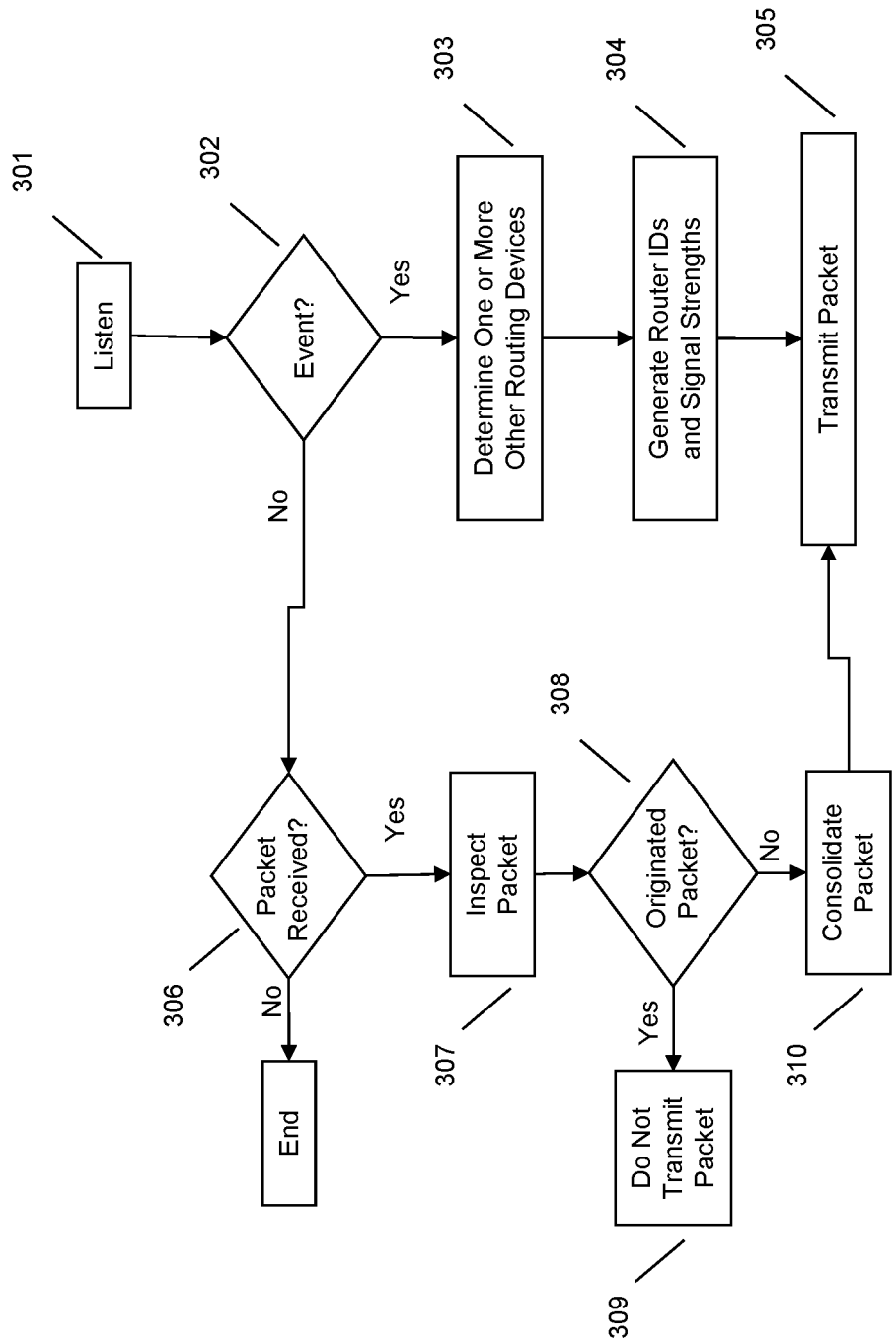
FIG. 3 illustrates an example method of providing data associated with a location of interest within a network.

As illustrated in FIG. 3, at 301 a network routing device may listen to other devices, e.g., other routers, in-home appliances, etc., that are in wireless range or connected to the network routing device, e.g., in a local network. If an event is detected by the network routing device, as illustrated at 302, the network routing device may determine one or more other routing devices are with wireless range, as illustrated at 303. An event may include, but is not necessarily limited to, a power outage, a network interruption (including a change in detectable devices), or other disruptive events for which reporting data may be useful, e.g., a change in temperature.

At 304, for the other wireless routing devices in range of the network routing device, a list of identifications and signal strengths may be prepared in order to include this data in a packet of data that is transmitted or broadcast at 305 by the network routing device. This provides location information about the other routing devices (e.g., via signal strength value) with respect to the network routing device. The network routing device may transmit the packet to a known destination, e.g., a known wireless address of one of the other routers and/or may be broadcast generally for detection and receipt by any appropriately configured receiving device.

A router that receives the packet of data may inspect the packet to determine if the data is redundant, has originated from or was previously transmitted by the router. This permits the router to delete the packet (if redundant or previously transmitted) or modify the packet's data content (if redundant or duplicate entries are found) prior to transmitting the data packet.

For example, the network routing device used by way of example in FIG. 3 may, rather than (or in addition to) detecting an event at 302, determine that it has received a packet from another router, e.g., as illustrated at 306. The network routing device then inspects the data of the packet at 307 to determine if the packet (or data included in the packet) originated from the network routing device, as indicated at 308. If the packet should not be transmitted or re-broadcast, the network routing device does not do so, as indicated at 309. For example, a network routing device might not re-broadcast a previously broadcast packet that contains no additional data, or might not re-transmit (more than a predetermined number of times) a packet that originated at the network routing device, or might not re-broadcast a packet that originated at the network routing device more than a predetermined number of times within a given time frame, etc.

However, if the packet inspection illustrated at 307 reveals that the packet is new, contains useful information that has not been seen by the network routing device in question, or otherwise should be transmitted (e.g., per a predetermined policy), the network routing device transmits the packet, as indicated at 305. The network routing device may consolidate the packet of data, i.e., merge a plurality of data packets or data packet entries into a single data packet or data packet entry, as indicated at 310. If the network routing device has Internet connectivity, it may forward the packet onto the broader network, e.g., to a service that uses the packet(s) to generate a network map. Further, if the network routing device has detected the event as well, as illustrated at 302, in addition to receiving a packet reporting the event, the network routing device may join itself to a region or blob for reporting purposes (not explicitly illustrated in FIG. 3). Thus, the network routing device may receive a packet of data reporting an event from another router or wireless node, as illustrated at 302, and additionally may sense the event itself. This information may be utilized by the network routing device for reporting purposes and building a network map, as further described herein.

Figure 4:
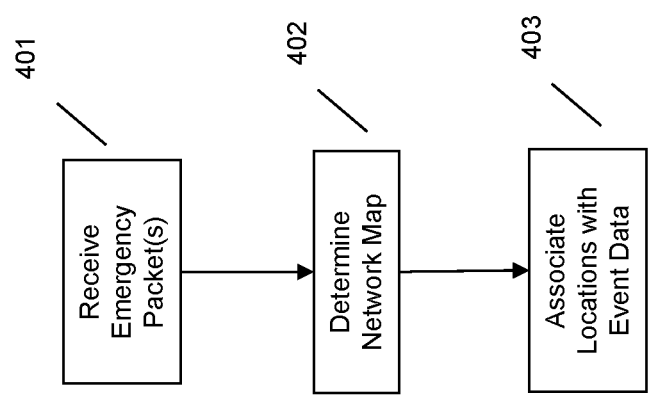
FIG. 4 illustrates an example method of using network data to provide a network map with associated event location(s).

Turning to FIG. 4, a service running on a network connected device receives the emergency packet(s) at 401, e.g., from a router that has Internet connectivity. This service inspects the packets to separate out router IDs contained therein into unique entities. Using an algorithm that relates the router IDs through signal strength relationships, the service builds up a relational map, e.g., having nodes that represent the routers and edges that represent signal strengths, as indicated at 402. Given the number of routers that may be linked indirectly through such a mapping process, a rich network of routers may be build up, with their relative positions indicated.

If at least one of the routers has a known physical position, e.g., as contained in data of the packet(s) and/or known ahead of time, the relative positions of the routers with respect to one another may be used to associate the routers with geographic locations. Likewise, if the event in question has a known location, e.g., for example a position within the network associated with a router or routers detecting and reporting the event, the service may additionally associate physical locations with the event, as illustrated at 403. Accordingly, an embodiment may automatically generate a network map that indicates the extent of an event, as perceived and reported by a router network using emergency packets.

The packet(s) may include other data that may be incorporated into the network map. For example, the routers may provide data that indicates that events of several types have been detected, e.g., a loss of commercial power supply, followed by network interruptions, followed by temperature drops. This data may be used to enrich the network map, e.g., to show a time-wise progression of the event and its impacts.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, at a wireless node, an abnormal event affecting a geographical location and disrupting network communications within at least a portion of the geographical location;
    determining, using a processor of the wireless node, one or more other wireless nodes within wireless range of the wireless node, wherein the one or more other wireless nodes are connected to the wireless node through a local network and wherein the one or more other wireless nodes cannot connect to a broader network and wherein the wireless node can connect to the broader network, wherein the one or more other wireless nodes generate and transmit an emergency data packet in response to the abnormal event;
    generating, after the abnormal event and at the wireless node, a packet of data comprising identifications of the one or more other wireless nodes, positional data associated with the one or more other wireless nodes, and information identifying the abnormal event, wherein the positional data identifies the geographical location, wherein a geographical position associated with the at least one wireless node is utilized to determine the relative positions of the one or more other wireless nodes in a network to produce a relational map, wherein the relational map illustrates an extent of the abnormal event affecting the network based upon the geographical positions of the at least one wireless nodes affected by the abnormal event, wherein the generating comprises inspecting the emergency data packets generated by each of the one or more other wireless nodes; and
    transmitting, over a network connection, the packet of data from the wireless node to one or more reporting network nodes connected to the broader network, wherein the packet of data comprises data associated with the abnormal event.

2. The method of claim 1, wherein the detecting comprises detecting a network interruption.

3. The method of claim 2, wherein the detecting comprises detecting the network interruption at the one or more other wireless nodes.

4. The method of claim 2, wherein the detecting comprises detecting a power loss at the wireless node.

5. The method of claim 1,
    wherein the inspecting comprises
    removing one or more duplicate entries in the packet of data; and
    wherein the transmitting comprises transmitting the packet of data having no duplicate entries over the network connection.

6. The method of claim 5, further comprising consolidating two or more packets of data into a single packet.

7. The method of claim 1,
    wherein the inspecting comprises
    identifying that the emergency data packet originated at the wireless node; and
    not transmitting the emergency data packet of data over the network connection.

8. The method of claim 1, wherein the detecting comprises detecting the abnormal event reported by a device included in a home network.

9. The method of claim 1, wherein the packet of data comprises location data of the wireless node.

10. The method of claim 1, wherein the packet of data comprises location data of the one or more other wireless nodes.

11. An apparatus, comprising:
a network communication device;
one or more processors operatively coupled to the network communication device; and
a memory comprising instructions executable by the one or more processors to:
detect, at the network communication device, an abnormal event affecting a geographical location and disrupting network communications within at least a portion of the geographical location;
determine one or more other wireless nodes within wireless range of the network communication device, wherein the one or more other wireless nodes are connected to the network communication device through a local network and wherein the one or more other wireless nodes cannot connect to a broader network and wherein the wireless node can connect to the broader network, wherein the one or more other wireless nodes generate and transmit an emergency data packet in response to the abnormal event;
generate, after the abnormal event and at the network communication device, a packet of data comprising identifications of the one or more other wireless nodes, positional data associated with the one or more other wireless nodes, and information identifying the abnormal event, wherein the positional data identifies the geographical location, wherein a geographical position associated with the at least one wireless node is utilized to determine the relative positions of the one or more other wireless nodes in a network to produce a relational map, wherein the relational map illustrates an extent of the abnormal event affecting the network based upon the geographical positions of the at least one wireless nodes affected by the abnormal event, wherein the generating comprises inspecting the emergency data packets generated by each of the one or more other wireless nodes; and
transmit, over a network connection, the packet of data from the network communication device to one or more reporting network nodes connected to the broader network, wherein the packet of data comprises data associated with the abnormal event.

12. The apparatus of claim 11, wherein the instructions that are executed by the one or more processors to detect comprise instructions that detect a network interruption.

13. The apparatus of claim 12, wherein the instructions that are executed by the one or more processors to detect comprise instructions that detect the network interruption at the one or more other wireless nodes.

14. The apparatus of claim 12, wherein the instructions that are executed by the one or more processors to detect comprise instructions that detect a power loss at the apparatus.

15. The apparatus of claim 11, wherein
the inspecting comprises
removing one or more duplicate entries in the packet of data; and
wherein to transmit comprises to transmit the packet of data having no duplicate entries over the network connection.

16. The apparatus of claim 15, further comprising instructions that are executable by the one or more processors to consolidate two or more packets of data into a single packet.

17. The apparatus of claim 11, wherein
the inspecting comprises
identifying that the emergency data packet originated at the apparatus and
not transmitting the emergency data packet over the network connection.

18. The apparatus of claim 11, wherein the apparatus is an Internet router.

* * * * *